United States Patent [19]

Hanson et al.

[11] Patent Number: 4,671,535
[45] Date of Patent: Jun. 9, 1987

[54] LOAD EQUALIZER AND STABILIZER FOR LEAF SPRING SUSPENSION SYSTEMS

[76] Inventors: Leon L. Hanson, 1421 N. Vine, Grand Island, Nebr. 68801; Thomas J. Iwanski, 4216 Kay Ave., Grand Island, Nebr. 68803

[21] Appl. No.: 827,986

[22] Filed: Feb. 10, 1986

[51] Int. Cl.⁴ .............................................. B60F 11/40
[52] U.S. Cl. ...................................... 280/718; 267/30; 267/36 A; 280/689
[58] Field of Search ............... 280/715, 718, 720, 689, 280/694, 699, 688; 180/71; 267/36 R, 36 A, 52, 56, 30

[56] References Cited

U.S. PATENT DOCUMENTS 1,937,854  12/1933  Stratton ................................ 280/715
2,220,001  11/1940  Schulze ................................ 267/30
2,969,230   1/1961  Scheublein, Jr. et al. ............. 267/30
3,069,149  12/1962  Neff ..................................... 267/33
3,606,376   9/1971  Hickman ......................... 280/124 RS
3,850,444  11/1974  Wright ............................. 280/124 R
3,897,844   8/1975  Chevalier ............................ 180/71
3,920,264  11/1975  Lafferty ......................... 280/124 R Primary Examiner—Richard A. Bertsch
Attorney, Agent, or Firm—Henderson & Sturm

[57] ABSTRACT

An attachment for a vehicle suspension system of a type having a frame, a pair of leaf springs attached at the ends thereof to each side of the frame and operatively attached centrally thereof to the rear axle housing. An abutment structure is attached to the frame on each side thereof just above the leaf springs on each side of the frame. These abutment structures are positioned generally between the rear axle and the rear end of the leaf springs for contacting an upper portion of the respective leaf springs under heavy load conditions to effectively shorten the operative length of the leaf springs automatically whereby the load will be effectively redistributed from rear to front upon engagement of the abutment structures with the top of the leaf springs. Structure is also provided for vertically adjusting the position of the abutment structures with respect to the leaf springs.

3 Claims, 7 Drawing Figures

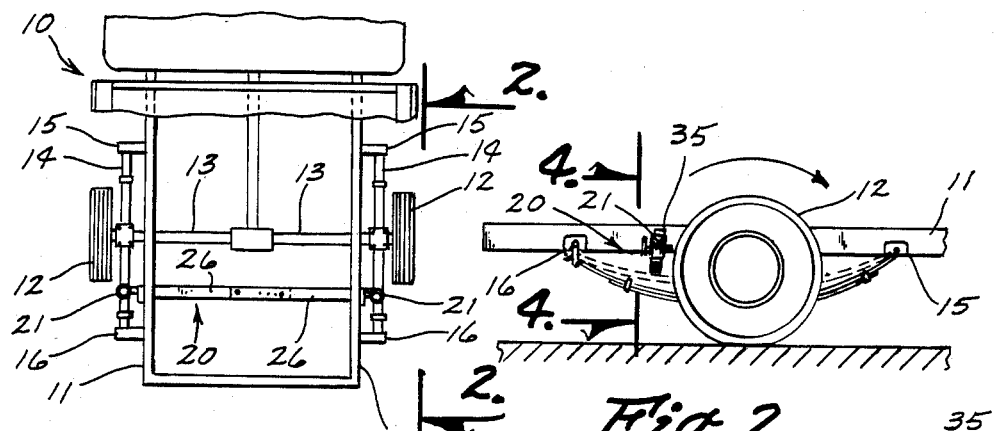
Fig. 1
Fig. 2
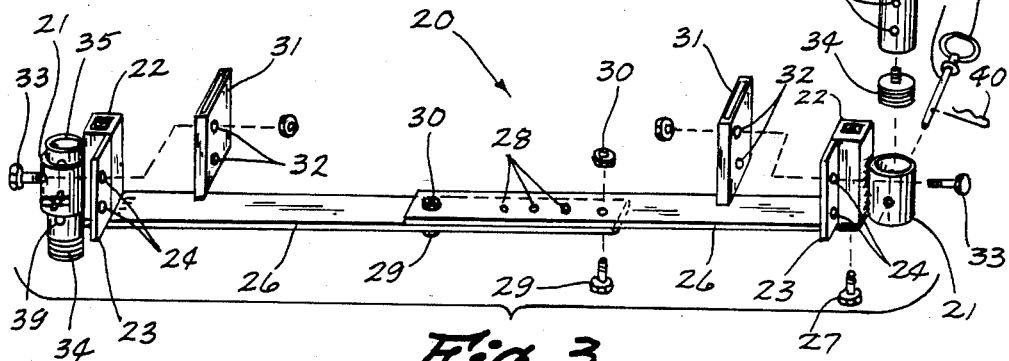
Fig. 3
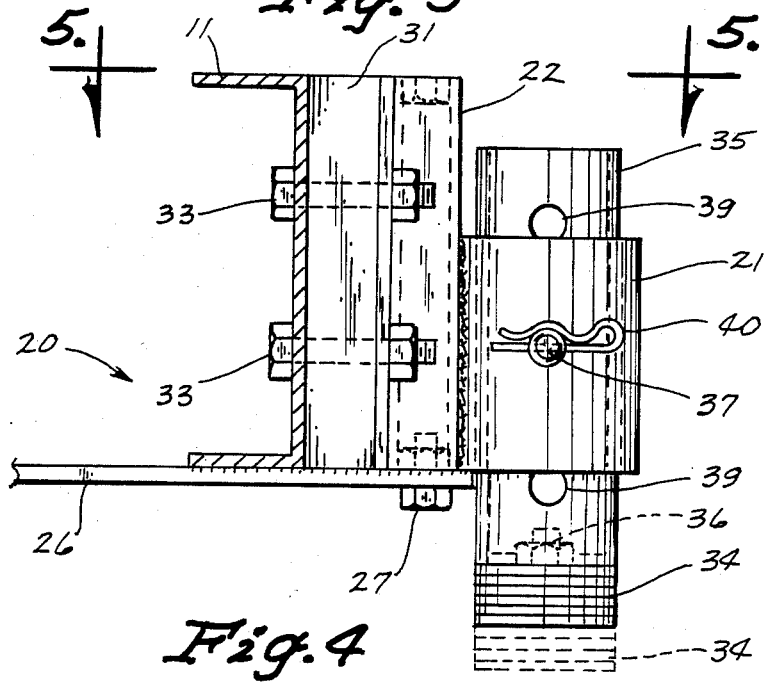
Fig. 4

LOAD EQUALIZER AND STABILIZER FOR LEAF SPRING SUSPENSION SYSTEMS

TECHNICAL FIELD

The present invention relates to vehicle suspension systems, and more particularly to an attachment to leaf spring suspension systems on trucks for automatically redistributing the load from rear to front under heavy load conditions.

BACKGROUND ART

When trucks having a frame which is rigid from the cab to the bed has heavy loads thereon, the rear end of the truck will go down and the front end of the truck will go up, thereby defeating a major purpose of the suspension system and creating an unstable vehicle. For this reason, many heavy suspension systems are produced at a considerable expense and also many vehicles have expensive overload spring structures attached thereto for the few times that the vehicle may have a very heavy load thereon.

U.S. Pat. No. 3,069,149 shows one form of auxiliary overload structure including a pair of rubber bumpers that bump together when the suspension coil springs have been overly compressed due to a very heavy load. This structure is not entirely satisfactory because when the rubber bumpers are together and the vehicle hits a bump, there is very little spring action in the rubber bumpers to resist the shock of such a bump.

U.S. Pat. No. 3,850,444 to Wright shows another overload spring arrangement, but it merely adds an additional spring element basically equivalent to adding another heavier coil spring to the suspension system rather than providing a way to modify the behavior of the suspension springs already present in the original equipment on the vehicle.

Accordingly, there is a need for a suspension system attachment to automatically redistribute the load from rear to front when under heavy load conditions.

DISCLOSURE OF THE INVENTION

The present invention relates to an attachment for a vehicle suspension system of a type having a frame, a pair of leaf springs attached at the ends thereof to each side of the frame and operatively attached centrally thereof to the rear axle housing. The present invention utilizes an abutment structure attached to the frame on each side thereof just above the leaf springs on each side of the frame. These abutment structures are positioned generally between the rear axle and the rear end of the leaf springs for contacting an upper portion of the respective leaf springs under heavy load conditions to effectively shorten the operative length of the leaf springs automatically whereby the load will be effectively redistributed from rear to front upon engagement of the abutment structures with the top of the leaf springs. Structure is also provided for vertically adjusting the position of the abutment structures with respect to the leaf springs.

An object of the present invention is to provide an improved vehicle suspension system.

Another object of the present invention is to provide a vehicle suspension system of a type using leaf springs for automatically redistributing the load from rear to front under heavy load conditions.

A further object of the present invention is to provide a load equalizer and stabilizer system for leaf spring suspension systems which are fully adjustable to many different sizes and shapes of trucks.

A still further object of the present invention is to provide a vehicle suspension system of the aforementioned type which is adjustable to vary the distance between an abutment structure and a multi-leaf spring whereby it can be adjusted as to how heavy a load it will take to cause the automatic redistribution to occur.

Other objects, advantages and novel features of the present invention will become apparent from the following detailed description of the invention, when considered in conjunction with the accompanying drawings.

BRIEF DESCRIPTION OF THE DRAWINGS

FIG. 1 is a top plan view of a truck frame having a leaf spring suspension system and the present invention attached thereto;

FIG. 2 is a side elevational view taken along line 2—2 of FIG. 1;

FIG. 3 is an enlarged perspective exploded view of the present invention in readiness to be attached to a leaf spring suspension system on a truck;

FIG. 4 is an enlarged cross sectional view taken along line 4—4 of FIG. 2;

BEST MODE FOR CARRYING OUT THE INVENTION

Figure 5:
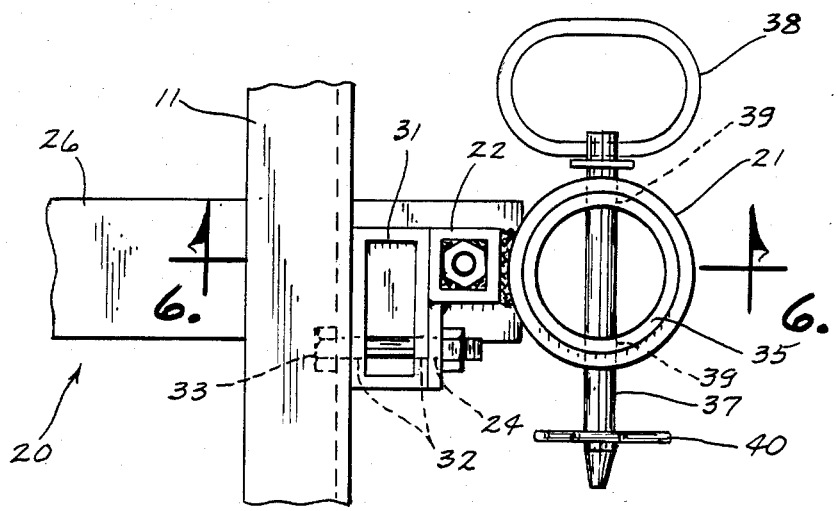
FIG. 5 is an enlarged view taken along line 5—5 of FIG. 4.

Referring now to the drawings, wherein like reference numerals designate identical or corresponding parts throughout the several views, FIG. 1 shows a truck (10) having longitudinal frame members (11), rear wheels (12) and rear axle housings (13) operatively attached thereto. Leaf springs (14) are operatively attached at the front thereof by attaching mechanisms (15) and are operatively attached to the frame (11) at the rear end thereof by mounting members (16). Consequently, when the wheels (12) hit a bump, they can move up and down with respect to the frame (11) by movement of the leaf springs (14) and are generally biased to the position shown in solid lines in FIG. 2.

Referring to FIG. 3, it is noted that a preferred embodiment (20) of the present invention has first outer tubes (21) which are welded to members (22), which in turn are welded to plates (23) having openings (24) disposed therein. Elongated plates (26) are attached to the bottom of the members (22) by a threaded fastener (27). The ends of the elongated plates (26) have a plurality of openings (28) disposed therein for alignment with each other in an adjustable fashion to receive a threaded bolt (29) and to be held in place by threaded nuts (30). When the members (26) are bolted together, they form a rigid brace between the longitudinal frame members (11) as can readily be seen in FIG. 1.

Spacer blocks (31) are utilized on the outside of longitudinal frame members (11) and on the inside of the members (22 and 23) whereby threaded nut and bolt fasteners (33) can be received through the openings (24) in the member (23), through openings in the frame (11) and through the openings (32) in spacer members (31).

These spacer members (31) can be of different sizes to form a shim to position the bumper members (34) directly over the leaf spring (14), for example as shown in FIGS. 1 and 2.

Figure 6:
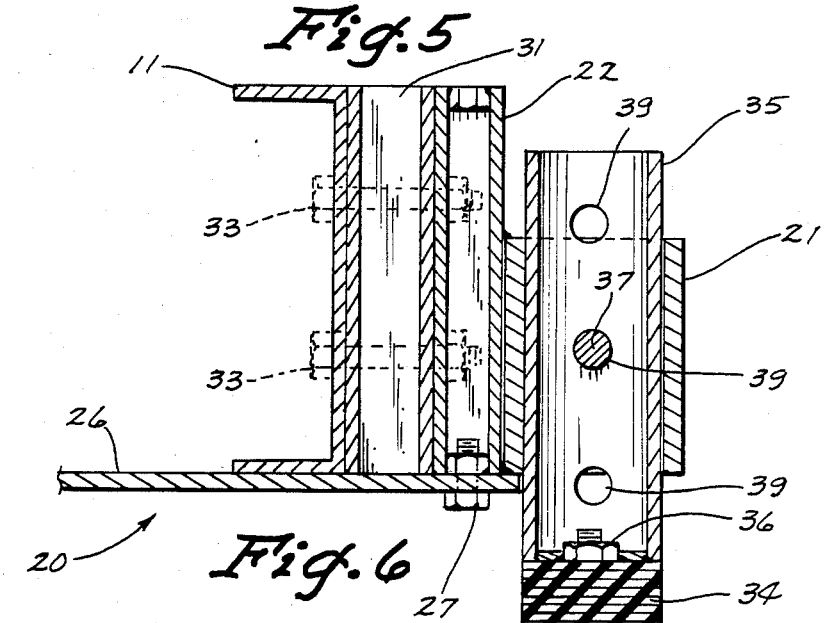
FIG. 6 is an enlarged cross sectional view taken along line 6—6 of FIG. 5.
Figure 7:
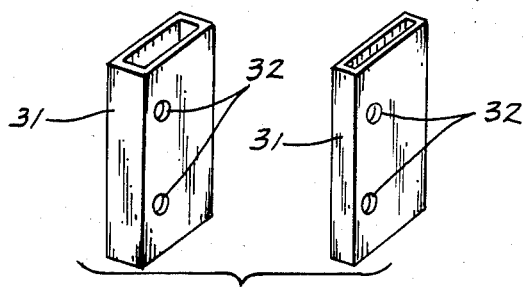
FIG. 7 is a perspective view of spacer blocks utilized to adjustably position the abutment structures directly over the leaf spring suspension members.

The rubber abutment members (34) are bolted to the bottom of the tubes (35) by a threaded fastener (36) as can readily be seen in FIGS. 3, 4 and 6. Once the apparatus (20) is connected to the longitudinal frame members (11) for example as shown in FIGS. 1 and 2, then the relative vertical position of the tube (35) with respect to the tube (21) is chosen to position the rubber abutment members (34) by a predetermined amount from the leaf springs (14). Once the position is determined, then a hitch pin (37) having a handle (38) is extended through aligned sets of openings (39) in tube (35) with the one set of aligned openings in the tube (21). Then a locking key (40) is utilized to extend through a hole in the end of the hitch pin (37) to securely lock the tube (35) with respect to the tube (21).

In operation of the present invention, if a heavier than normal load is positioned on the bed of the truck shown in FIG. 1, then the frame members (11) will move down relative to the position of the spring members (14) shown in FIG. 2 to the point that the spring members will be in the position shown in dashed lines in FIG. 2 and in abutment with the rubber abutment members (34). When this happens, it effectively shortens the leaf spring (14) as if it were attached at the point where the bumper members (34) are in abutment, instead of at the point (16). This has the effect of redistributing the load from rear to front and will tend to prevent the rear end of the truck from going down too much, which would also cause the front end of the truck to raise by an unacceptable amount.

Acccordingly, it will be appreciated that the preferred embodiment shown herein does indeed accomplish the aforementioned objects. Obviously, many modifications and variations of the present invention are possible in light of the above teachings. It is therefore to be understood that, within the scope of the appended claims, the invention may be practised otherwise than as specifically described.

We claim:

1. In a vehicle suspension system of a type including a frame, a pair of leaf springs attached at the ends thereof to the frame and operatively attached centrally thereof to the rear axle housing the improvement comprising:

abutment means attached to said frame on each side thereof directly above respective ones of said leaf springs generally between the rear axle and the rear end of the leaf springs for contacting an upper portion of the respective leaf springs under heavy load conditions to effectively shorten the operative length of the leaf springs whereby the load will be effectively redistributed from rear to front upon engagement of said abutment means with said leaf springs;

vertical adjusting means for attaching each respective one of said abutment means to said frame, said vertical adjusting means comprising;

a first tube;

a second tube adjustably slideably disposed in said first tube;

a resilient material attached to the bottom of said second tube; and means for adjustably locking said second tube into any one of a number of predetermined vertical positions with respect to said first tube.

2. The improvement of claim 1 including:

a member rigidly attached to each respective one of said first tubes and adapted to be secured to a respective side of said frame;

an elongated plate attached to each respective one of said members and extending horizontally towards the opposite side of the vehicle from the side to which it is attached; and holes formed in each of said elongated plates for adjustably permitting said plates to be bolted together to form a rigid brace between opposite sides of the frame and to permit universal installation on vehicles of different size.

3. The improvement of claim 2 wherein each of said first tubes has a set of aligned horizontal openings disposed through opposite sides thereof and each of said second tubes has a plurality of sets of aligned openings therethrough vertically spaced from each other and a pin extends through one set of aligned openings in said first and second tubes and is adjustable to be extended through other sets of openings in the second tube when aligned with the set of aligned openings in the first tube.

* * * * *